United States Patent
Siefert et al.

(10) Patent No.: US 10,784,057 B2
(45) Date of Patent: Sep. 22, 2020

(54) SAFETY SWITCH

(71) Applicant: Euchner GmbH + Co. KG, Leinfelden-Echterdingen (DE)

(72) Inventors: Timo Siefert, Leinfelden-Echterdingen (DE); Melissa Joos, Leinfelden-Echterdingen (DE); Frederic Hahn, Langenfeld (DE); Zeiler Gerd, Leinfelden-Echterdingen (DE)

(73) Assignee: Euchner GmbH + Co. KG, Leinfelden-Echterdingen (DE)

( * ) Notice: Subject to any disclaimer, the term of this patent is extended or adjusted under 35 U.S.C. 154(b) by 35 days.

(21) Appl. No.: 16/370,903

(22) Filed: Mar. 30, 2019

(65) Prior Publication Data
US 2019/0326071 A1 Oct. 24, 2019

(30) Foreign Application Priority Data
Apr. 20, 2018 (EP) .................................... 18168556

(51) Int. Cl.
*H01H 3/02* (2006.01)
*F16P 3/10* (2006.01)

(52) U.S. Cl.
CPC .............. *H01H 3/022* (2013.01); *F16P 3/10* (2013.01)

(58) Field of Classification Search
CPC combination set(s) only.
See application file for complete search history.

(56) References Cited

U.S. PATENT DOCUMENTS

| | | | |
|---|---|---|---|
| 10,332,703 B2* | 6/2019 | Aartsen | H01H 13/83 |
| 2006/0214515 A1* | 9/2006 | Pullmann | H03K 17/9502 307/326 |
| 2007/0091518 A1* | 4/2007 | Pullmann | H01H 47/002 361/23 |
| 2008/0074214 A1* | 3/2008 | Poyner | H01H 36/0006 335/13 |
| 2008/0128444 A1* | 6/2008 | Schininger | G07F 11/54 221/3 |
| 2011/0041711 A1* | 2/2011 | Nickell-Lean | B30B 1/006 100/214 |
| 2011/0259060 A1* | 10/2011 | Leska | F16P 3/10 70/174 |
| 2014/0230191 A1* | 8/2014 | Bertani | E05D 11/10 16/349 |
| 2016/0133416 A1* | 5/2016 | Pizzato | H01H 50/02 361/142 |
| 2016/0156351 A1* | 6/2016 | Pizzato | H03K 17/95 307/326 |
| 2017/0040131 A1* | 2/2017 | Kraus | H01H 47/002 |
| 2017/0365425 A1* | 12/2017 | Aartsen | H01H 27/002 |
| 2019/0206637 A1* | 7/2019 | Pizzato | H01H 3/022 |
| 2019/0324410 A1* | 10/2019 | Siefert | G05B 9/03 |
| 2019/0326071 A1* | 10/2019 | Siefert | H01H 47/002 |

* cited by examiner

*Primary Examiner* — Adam D Houston
(74) *Attorney, Agent, or Firm* — Michael Soderman

(57) ABSTRACT

A safety switch (1) having an input/output structure and means for generating a switching signal. Depending on the switching signal, the operation of the system can be released. The input/output structure forms means of connection for connecting a start button (5). By manually actuating the start button (5), an acknowledgment signal for releasing the system is generated. The means of connection are detected automatically in the safety switch (1).

12 Claims, 1 Drawing Sheet

SAFETY SWITCH

CROSS REFERENCE TO RELATED APPLICATIONS

This application claims the priority of EP 18168556.1 filed on Apr. 20, 2018; this application is incorporated by reference herein in its entirety.

BACKGROUND

The invention concerns a safety switch.

Safety switches are used in the area of safety technology, with said switches being used, in particular, for securing hazardous areas around systems. The term 'system' comprises, in particular, also machines, work equipment, and such.

Such safety switches may, e.g., work with transponders, with the transponder signals allowing the detection of whether a separating safety device, such as a door as access to a system, is closed or not.

Such a safety switch generally possesses an input/output structure having inputs and outputs that can, in particular, be designed to be redundant. The safety switch generates in accordance with its monitoring function, in particular, depending on the transponder signal, a switching signal that is output to a controller that controls the system to be monitored. If the safety switch detects a non-hazardous state, in particular, that a door to be monitored is closed, thus blocking the access to a hazardous area in which, e.g., the system is arranged, a switching signal with the switching state of "switched-on state" corresponding to an active safety condition, i.e., a release signal, will be generated. If the controller receives this release signal from the safety switch, the controller can start the operation of the system, or allow the system to continue to operate. If, however, the safety switch detects an open door, the safety switch will generate a switching signal having the "switched-off" switching state, corresponding to a non-active safety condition. In this case, the safety switch will switch the system off in order to prevent hazardous conditions.

To such a safety switch can, in particular, also be assigned a start button. By manually operating the start button, an acknowledgment signal can be generated for releasing the system. A user operating the start button signals through the acknowledgment signal that no person is present in the hazardous area. This provides another safety function in addition to the monitoring function of the safety switch. For the operation of the system will only be released if the safety switch generates a release signal for the system and if an acknowledgment signal using the start button is present. This allows excluding hazardous situations during the release of system operation with a high level of certainty.

SUMMARY

The invention concerns a safety switch (1) having an input/output structure and means for generating a switching signal. Depending on the switching signal, the operation of the system can be released. The input/output structure forms means of connection for connecting a start button (5). By manually actuating the start button (5), an acknowledgment signal for releasing the system is generated. The means of connection are detected automatically in the safety switch (1).

DETAILED DESCRIPTION

The problem underlying the invention is to provide a safety switch with enhanced functionality.

For solving this problem, the features of claim 1 are provided. Advantageous embodiments and useful further embodiments are described in the dependent claims.

The invention concerns a safety switch with an input/output structure and with means for generating a switching signal. The operation of the system can be released depending on the switching signal. The input/output structure forms means of connection for connecting a start button. By manually actuating the start button, an acknowledgment signal for releasing the system is generated. The means of connection are automatically detected by the safety switch.

Thus, a significant advantage of the invention consists of the fact that the safety switch autonomously detects the connection of a start button. Herein, the safety switch will automatically integrate the start button into said switch's operation such that the overall system of safety switch and start button is operable without complex configuration or calibration processes, in particular, such processes tied to a user, being necessary.

The integration of the start button into the operation of the safety switch generally occurs by the acknowledgment signal generated in the start button being available in the safety switch and being transmitted by said switch, with or without in-switch evaluation, to another unit, in particular, a higher-level controller controlling the operation of the system.

The automatic detection of the start button's connection by the safety switch thus achieves not only an automated process for the safety switch itself, but also for the entire safety system into which the safety switch is integrated.

In accordance with the invention, the detection of whether or not a start button is connected to the safety switch is performed by detecting specific means of connection at the input/output structure of the safety switch. Depending on whether or not a start button is present, different means of connection will be present at the input/output structure, in particular, different types of wiring on in- and outputs of the input/output structure, with these types of wiring being detectable as control signals in the safety switch, wherein based on these control signals, it can be unambiguously determined whether or not a start button is present.

Particularly advantageously, an adapter is provided as wiring for connecting the start button.

The adapter connected to in- and/or outputs of the input/output structure of the safety switch can be unambiguously identified based on control signals received in the safety switch, which allows reliable detection of the connection of the start button.

In accordance with an advantageous embodiment, the connection of the start button is detected during a start-up phase. This start-up phase is, in particular, the ramp-up phase during each device start-up before the normal operation phase, i.e. the operating mode.

In particular, this start button generates a control signal during the start-up phase. Depending on how the control signal can be read back, the connection of the start button will be detected.

This embodiment is advantageous for the reason that the fact whether a start button is assigned to said safety switch is already detected automatically in the safety switch during the start-up phase before operation is commenced. The safety switch then automatically adjusts its function accordingly and is then operable during the subsequent operating mode without additional configuration or calibration processes.

Particularly advantageously, for detecting the connection of a start button, the existing control signal used for starting up the safety switch is used, thus allowing the signal detection effort in the safety switch for detecting the connection of the safety switch to be kept low. Herein use is made of the fact that the control signal read back into the safety switch, due to the characteristic wiring of the start button, depends unambiguously on the fact of whether or not a start button is present.

As a matter of principle, only a single safety switch may be provided, in particular, as an integral part of a safety system for the safe release of the operation of a system.

In accordance with an advantageous embodiment of the invention, a series connection of safety switches is provided as a component of a safety system. Such an arrangement of multiple safety switches allows realizing even complex monitoring functions.

In such a series connection, a plug is expediently assigned to each safety switch, thus connecting the safety switch to this series connection. Instead of a plug, direct wiring can also be provided.

This plug is embodied, in particular, as a Y-plug such that it has a first connection face for connecting the safety switch, and two additional connection faces, with one each of these connection faces serving to connect to the downstream and the upstream Y-plug of the series connection.

Then, in operation without a start button, a safety switch is directly connected to the plug. Here, a bridge that bridges an input and an output of the safety switch is present in the plug.

The bridge forms a characteristic wiring based on which the safety switch can detect that no start button is present.

Here, a control signal is read back through the bridge via the input into the safety switch, with said control signal signaling the direct connection of the plug to the safety switch.

In this manner the fact that no start button is present can be simply and reliably detected in the safety switch.

In operation with a start button, it is connected between a safety switch and its assigned plug, in particular, the Y-plug. In such a connection, an adapter is preferably used, thus bypassing the bridge in the plug.

Here, the start button is connected by means of the adapter to an input of the safety switch. At the input, a control signal is generated that signals the connection of the start button.

The connection of the adapter thus forms a characteristic wiring that can be unambiguously identified by reading back the control signal generated depending on this wiring, thus allowing the connection of the start button to be reliably detected.

BRIEF DESCRIPTION OF THE DRAWINGS

Below, the invention is explained based on the drawings. They show the following.

DETAILED DESCRIPTION OF THE PREFERRED EMBODIMENTS

Figure 1:
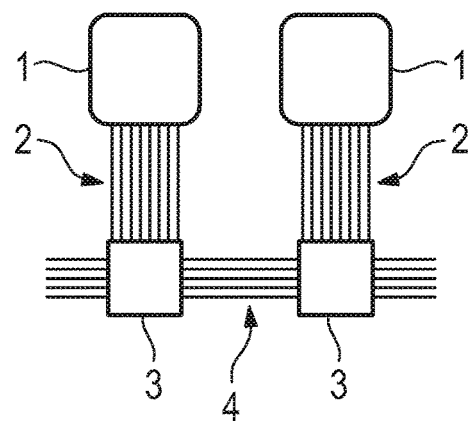
FIG. 1: A schematic representation of a series connection of safety switches.

FIG. 1 shows, in a very schematic manner, a series connection consisting of an arrangement of multiple safety switches 1.

Here, FIG. 1 shows a series connection of two identically laid-out safety switches 1. It is, however, not mandatory for the safety switches 1 to be identical. Generally, the series connection can also have a different number of safety switches 1. Finally, a single safety switch 1 can also be used.

The safety switches 1 are used in the area of safety technology. In particular, a safety switch 1 is used for monitoring whether a separating safety device, such as a door blocking the access to a hazardous area in which a hazardous system is located, is closed. Here, the closed position of the door can be checked by means of transponder signals. Here, a transponder can be arranged inside an actuator that is arranged on and movably connected to the door. The safety switch 1 is then arranged on a frame delimiting the access. If the door is in the closed position, the transponder is within the reading range of an RFID reading device arranged in the safety switch 1, so that the RFID reading device can receive the transponder's transponder signals.

As FIG. 1 shows, each safety switch 1 has an 8-pin input/output structure from which a line arrangement 2 having 8 lines is routed to one plug 3 laid out as a Y-plug, i.e., as a three-way adapter. In the Y-plug, the connections to the plug 3 will be converted to connections for the plugs 3 among each other. Here, the plug 3 has two connection faces having five connections each, with each plug 3 being connectable with a connection face to the upstream plug 3, and with another connection face to the downstream plug 3 so that the plugs 3 are connected to each other by a line arrangement 4 having five lines. This connection scheme is not mandatory, in particular, each safety switch 1 and also the assigned plug 3 can have different connection patterns. In addition, instead of a plug 3, wiring can also be provided.

Figure 2:
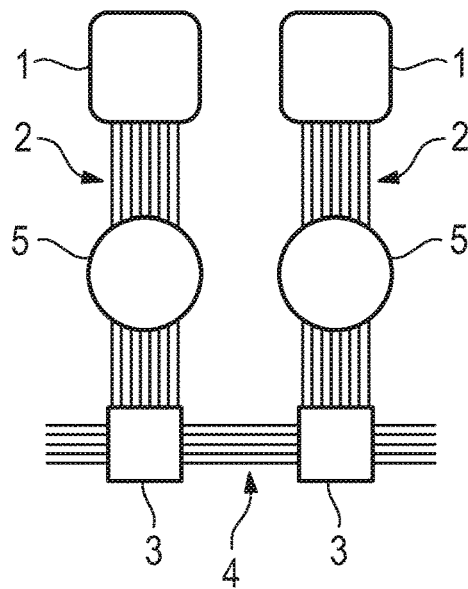
FIG. 2: The series connection according to FIG. 1 with the start buttons assigned to the safety switches.

FIG. 2 shows a variant of the series connection that is expanded versus the series connection according to FIG. 1 in that a start button 5 is arranged between the safety switch 1 and the plug 3.

Each start button 5 can be manually actuated by a user, whereby an acknowledgment signal is generated that is routed to the assigned safety switch 1. By means of the acknowledgment signal the user acknowledges, e.g., that nobody is present in the hazardous area.

The presence of the acknowledgment signal of each start button 5 is, in addition to a release signal generated in the security switch 1, a necessary condition for the operation of the system being started.

The acknowledgment signals will be linked to the release signals generated in the safety switch 1 or forwarded jointly via the series connection, thus being provided to the higher-level controller. The controller will only release the operation of the system if each safety switch 1 generates a release signal, and an acknowledgment signal has been generated by each start button 5.

Figure 3:
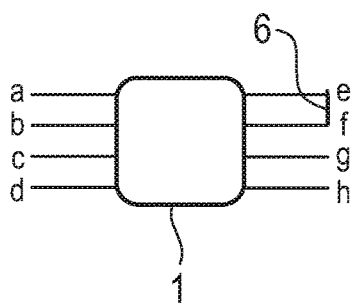
FIG. 3: External wiring of an input and output of a safety switch during operation without a start button.

FIG. 3 shows a safety switch 1 that is integrated into the series connection according to FIG. 1.

The 8-pin input/output structure comprises connections a, d for a supply voltage, two inputs b, c as a redundant input structure, two outputs f, g as a redundant output structure, a communications port h, and a start input e. The inputs b, c are safety inputs via which switching signals from the upstream safety switch 1 are read. Accordingly, the outputs f, g are safety outputs for outputting switching signals to the downstream safety switch 1.

The series connection according to FIG. 1 is operated without a start button 5 so that the safety switch 1 is directly connected to the plug 3. In the plug 3, a bridge 6 is provided that, as shown in FIG. 3, bridges the output f and the start input e. The control signal generated during the start-up phase is read back to start input e via the bridge 6.

Figure 4:
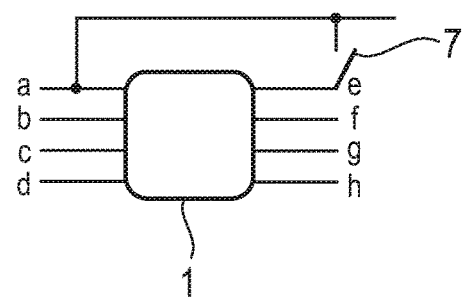
FIG. 4: External wiring of an input and an output.

FIG. 4 shows the safety switch 1 according to FIG. 3 for integration into the series connection according to FIG. 2, i.e., in this case a start button 5 is present between the safety switch 1 and the plug 3.

The start button 5 is connected to safety switch 1 via an adapter 7, which is connected to the start input e and to the supply voltage connection a. By means of this adapter 7, the bridge 6 in plug 3 is bypassed.

In this case, during the start-up phase, due to the connection of the adapter 7 a static signal, in particular, a low signal is obtained as a control signal. This control signal is unambiguously distinct from the cyclically varying control signal when a start button 5 is connected.

Thus the fact whether or not a start button 5 is present is, based on the control signals, unambiguously detected in the safety switch 1 during the start-up phase. Then the safety switch 1 can, when the start button 5 is connected, integrate said button into the operation without separate configuration or calibration processes being necessary for this purpose, i.e., the safety switch 1 can simply transition from the start-up phase to the operating mode.

LIST OF REFERENCE NUMERALS (1) Safety switch
(2) Wiring assembly
(3) Plug
(4) Wiring assembly
(5) Start button
(6) Bridge
(7) Adapter

The invention claimed is:

1. A safety switch (1) having an input/output structure and means for generating a switching signal, wherein the operation of a system can be released depending on the switching signal, characterized in that the input/output structure forms means of connection for connecting a start button (5), wherein an acknowledgment signal for releasing the system is generated by manually actuating the start button (5), and that the means of connection are automatically detected in the safety switch (1).

2. The safety switch (1) according to claim 1, characterized in that during its operation with or without the start button (5), different wiring schemes of inputs and/or outputs of the input/output structure are present, which schemes are detected in the safety switch (1).

3. The safety switch (1) according to claim 2, characterized in that an adapter (7) is provided as wiring for connecting the start button (5).

4. The safety switch (1) according to claim 1, characterized in that during a start-up phase, the connection of the start button (5) is detected.

5. The safety switch (1) according to claim 4, characterized in that said switch generates a control signal during the start-up phase, wherein the connection of the start button (5) is detected depending on whether the control signal can be read back.

6. The safety switch (1) according to claim 1, characterized in that said switch is a component of a series connection of multiple safety switches (1).

7. The safety switch (1) according to claim 1, characterized in that said switch is assigned a plug (3) or a wiring for connecting to the series connection.

8. The safety switch (1) according to claim 7, characterized in that said switch during operation without a start button (5) is directly connected to the plug (3), wherein in the plug (3) or in the wiring a bridge (6) is present that bridges an input and an output of the safety switch (1).

9. The safety switch (1) according to claim 8, characterized in that through the bridge (6) via the input to the safety switch (1) a control signal is read back that signals the direct connection of the plug (3) or of the wiring to the safety switch (1).

10. The safety switch (1) according to claim 7, characterized in that between said switch and the plug (3) or the wiring, a start button (5) is connected.

11. The safety switch (1) according to claim 10, characterized in that the start button (5) is connected by means of the adapter (7) to an input of the safety switch (1), wherein at the input a control signal is generated signaling the connection of the start button (5).

12. The safety switch (1) according to claim 11, characterized in that the adapter (7) forms a bypass of the bridge (6) of the plug (3) or of the wiring.

\* \* \* \* \*